(12) United States Patent
Ergen et al.

(10) Patent No.: US 11,937,102 B2
(45) Date of Patent: Mar. 19, 2024

(54) OPTIMIZING UTILIZATION AND PERFORMANCE OF ONE OR MORE UNLICENSED BANDS IN A NETWORK

(71) Applicant: Ambeent Inc., Yuba City, CA (US)

(72) Inventors: Mustafa Ergen, İstanbul (TR); Mehmet Fatih Tuysuz, Istanbul (TR)

(73) Assignee: Ambeent Inc., Yuba City, CA (US)

( * ) Notice: Subject to any disclaimer, the term of this patent is extended or adjusted under 35 U.S.C. 154(b) by 76 days.

(21) Appl. No.: 17/343,173

(22) Filed: Jun. 9, 2021

(65) Prior Publication Data

US 2022/0400392 A1    Dec. 15, 2022

(51) Int. Cl.
*H04W 24/02* (2009.01)
*H04L 41/5009* (2022.01)
*H04W 16/14* (2009.01)
*H04W 24/08* (2009.01)

(52) U.S. Cl.
CPC ......... *H04W 24/02* (2013.01); *H04L 41/5009* (2013.01); *H04W 16/14* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 9,762,402 B2 * | 9/2017 | Batz | ...................... | H04M 15/66 |
| 10,432,375 B1 * | 10/2019 | Kang | .................... | H04W 72/52 |
| 2009/0323600 A1 * | 12/2009 | Chandra | ............... | H04W 28/18 |
| | | | | 370/437 |
| 2013/0070688 A1 * | 3/2013 | Picker | ................... | H04W 72/54 |
| | | | | 370/329 |
| 2014/0274104 A1 * | 9/2014 | Amanna, III | ........ | H04B 17/318 |
| | | | | 455/454 |
| 2016/0066202 A1 * | 3/2016 | Dayanandan | ......... | H04W 16/00 |
| | | | | 370/252 |

(Continued)

OTHER PUBLICATIONS

Network proxy, "BGP: Concept: Troubleshooting", https://networkproxy.wordpress.com/2014/02/09/bgp-concepts-advance-troubleshooting/, Feb. 9, 2014. (Year: 2014).*

(Continued)

*Primary Examiner* — Faruk Hamza
*Assistant Examiner* — Cassandra L Decker
(74) *Attorney, Agent, or Firm* — CHIP LAW GROUP

(57) ABSTRACT

Provided is a method and system for optimizing utilization and performance of one or more unlicensed bands in a network (Wi-Fi and Citizens Broadband Radio Service (CBRS)) through a client device application that communicates with a central node deployed on a cloud platform. The method and system collects Radio Frequency (RF) measurements from a plurality of client devices and from a plurality of nearby point of attachments (PoAs) and transmits the collected RF measurements to the cloud platform. An optimal transmission channel/network in the one or more unlicensed bands is then calculated for one or more nearby PoAs using an Artificial Intelligence (AI) module based on the RF measurements, which utilizes a Dynamic Frequency Selection (DFS), an Automated Frequency Coordinator (AFC) and a Spectrum Access System (SAS) to select the optimal transmission channel/network based on the data-rate result received from the DFS, AFC and SAS.

24 Claims, 8 Drawing Sheets

(56) References Cited

U.S. PATENT DOCUMENTS

| | | | |
|---|---|---|---|
| 2016/0072691 A1* | 3/2016 | Xu | H04B 7/18578 |
| | | | 370/252 |
| 2016/0094965 A1* | 3/2016 | Sennett | H04W 4/90 |
| | | | 455/404.1 |
| 2017/0329462 A1* | 11/2017 | Maheshwari | G06F 3/04812 |
| 2018/0184430 A1* | 6/2018 | Das | H04L 43/20 |
| 2018/0324595 A1* | 11/2018 | Shima | H04W 16/10 |
| 2019/0104489 A1* | 4/2019 | Huang | H04W 16/14 |
| 2019/0223037 A1* | 7/2019 | Raghothaman | H04W 72/085 |
| 2019/0246324 A1* | 8/2019 | Cizdziel | H04W 36/06 |
| 2019/0324759 A1* | 10/2019 | Yang | G06N 3/08 |
| 2020/0213862 A1* | 7/2020 | Sevindik | H04W 72/082 |
| 2020/0359229 A1* | 11/2020 | Macmullan | H04W 16/14 |
| 2021/0068025 A1* | 3/2021 | Shukla | H04W 28/08 |
| 2021/0143893 A1* | 5/2021 | Taneja | H04W 60/00 |
| 2021/0258848 A1* | 8/2021 | Das | H04W 36/165 |
| 2021/0392511 A1* | 12/2021 | Balachandran | H04W 24/02 |
| 2022/0104027 A1* | 3/2022 | Gao | H04W 16/14 |
| 2022/0150712 A1* | 5/2022 | Sevindik | H04W 28/26 |
| 2022/0394694 A1* | 12/2022 | Vankayala | H04W 28/0268 |

OTHER PUBLICATIONS

V. Oliveira, "JavaFxAsyncTask: A easy way to handle multithreading in JavaFX", https://medium.com/@victorlaertedoliveira/archive-javafx-asynctask-a-easy-way-to-handle-multithreading-in-javafx-26689f3cd8fa, Aug. 26, 2017. (Year: 2017).*

Han et al., "Spectrum sharing methods for the coexistence of multiple RF systems: A survey", Ad Hoc Networks 53 (2016), pp. 53-78. (Year: 2016).*

S. Matta, "Leveraging reinforcement learning to optimize Wi-Fi", https://www.mist.com/resources/leveraging-reinforcement-learning-optimize-wi-fi/, Feb. 13, 2019. (Year: 2019).*

\* cited by examiner

OPTIMIZING UTILIZATION AND PERFORMANCE OF ONE OR MORE UNLICENSED BANDS IN A NETWORK

CROSS-REFERENCE TO RELATED APPLICATIONS/INCORPORATION BY REFERENCE

None.

FIELD

Various embodiments of the present disclosure generally relate to communication using various frequency bands in a network. Specifically, the present disclosure relates to a method and system for optimizing utilization and performance of one or more unlicensed bands in a network.

BACKGROUND

Wireless spectrum, particularly the bands being used solely by the governments, is often used inefficiently. Mobile Network Operators (MNOs) are now reaching the limits of their allocated spectrum as mobile users and hence the data usage increase dramatically each year. In addition, the high cost of licensed spectrum forces the MNOs to use unlicensed bands, such as deploying Wi-Fi access points (APs) to crowded places to offload their cellular data to a Wi-Fi network. However, only a small portion of overall customers can be covered within a basic service set (BSS) or an extended service set (ESS), which hinders exploitation of the overall potential of unlicensed spectrum for the offloading.

Wi-Fi utilizes unlicensed spectrum that is of great economic value to society, but it comes at the price of uncertain performance. The unlicensed spectrum includes small sections of the radio spectrum in which devices can transmit, up to a limit in power, without needing to apply (or usually pay) for a radio operator's license of which Wi-Fi is a classic incumbent. Two bands have been allocated at 2.4 GHz and 5 GHz in which anyone can transmit at no more than 1 watt of power. However, given the free and decentralized nature of unlicensed spectrum, multiple issues may affect the overall performance of the system. Further, the use of unlicensed spectrum is subject to interference, coverage issues, and poor performance. Generally, operations in unlicensed bands lack visibility and as a result, it is difficult to manage or prevent issues since users and/or operators do not know what to look for. As an example, interference from neighboring devices is one of the drawbacks of operating in unlicensed mode and the mix of devices operating in this environment degrades the performance for everyone. Often, neighboring devices end up using the same channel creating an unavoidable congestion.

In this context, the Federal Communications Commission (FCC) has paved the way for dynamic nationwide sharing of spectrum, starting with the Citizens Broadband Radio Service (CBRS) in the 3.5 GHz radio band that will be available for LTE/5G networks and also with the 6 GHz band that will be available for Wi-Fi networks. In this way, spectrum available in the unlicensed band for Wi-Fi and Private 5G networks will include not only the 2.4 GHz and 5 GHz bands but also 3.5 GHz and 6 GHz bands. Even though this increase in the unlicensed spectrum will result in higher room for Wi-Fi and Private 5G networks, optimizing wireless spectrum by integrating Wi-Fi with CBRS should be the main focus in order to lead to an efficient channel utilization in the unlicensed band and to better compensate for the explosive growth of wireless data.

Limitations and disadvantages of conventional and traditional approaches will become apparent to one of ordinary skill in the art, through comparison of described systems with some aspects of the present disclosure, as set forth in the remainder of the present application and with reference to the drawings.

SUMMARY

A method and system for optimizing utilization and performance of one or more unlicensed bands in a network is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
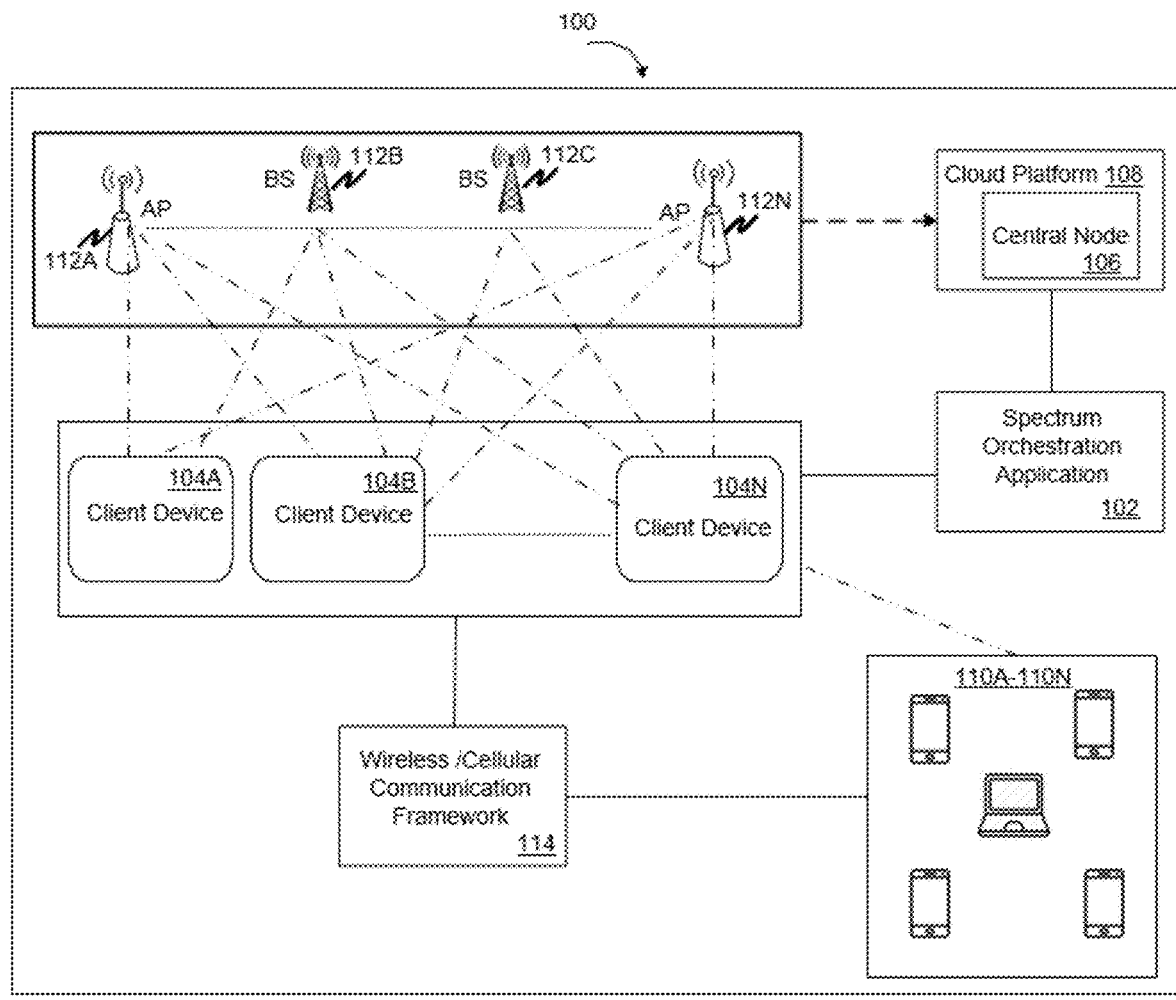
FIG. 1 is a diagram that illustrates a system for optimizing utilization and performance of one or more unlicensed bands in a network, in accordance with an exemplary embodiment of the disclosure.

The following described implementations may be found in the disclosed method and system for optimizing utilization and performance of one or more unlicensed bands in a network through a client device application that communicates with a central node deployed on a cloud platform. The method and system collects Radio Frequency (RF) measurements from a plurality of client devices and from a plurality of nearby point of attachments (PoAs). A PoA may include, but is not limited to, a Wi-Fi Access Point (AP) and a 5G/LTE Base Station (BS). The RF measurements may include, but are not limited to, Received Signal Strength Indicator (RSSI) measurements/values, capabilities and channels. The RF measurements collected from the plurality of client devices in the vicinity and the plurality of nearby PoAs are transmitted to the cloud platform. The method and system also transmits information pertaining to the one or more unlicensed bands and user preferences (related to minimum data rate, handover request, and offloading setup). The information may include, but is not limited to, neighbor APs, channel number, RSSI, channel utilization rate, interference, shared spectrum, available spectrum, channel band, and Subscriber Identification Module (SIM) card. At the cloud platform, an optimal transmission channel/network in the one or more unlicensed bands is calculated for one or more nearby PoAs of the plurality of nearby PoAs using an Artificial Intelligence (AI) module based on the RF measurements. The term "optimal", as used herein, connotes an improvement over that which was previously determined or substantially or practically best, however, does not necessarily imply guaranteeing the absolute theoretical best performance. The term "optimal transmission channel/network", as used herein, connotes a transmission channel/network that provides the highest throughput based on actual/predicted throughput given a set of circumstances and conditions. The AI module utilizes a Dynamic Frequency Selection (DFS), an Automated Frequency Coordinator (AFC) and a Spectrum Access System (SAS) to select the optimal transmission channel/network based on the data-rate result received from the DFS, the AFC and the SAS. An optimal transmission channel/network may include, but is not limited to, Wi-Fi channels and 5G/LTE Band 48.

In accordance with an embodiment, the system is configured to calculate the optimal transmission channel/network in the one or more unlicensed bands, the AI module solves a complex optimization problem based on the RF measurements collected from the plurality of client devices in the vicinity and the RF measurements collected from the plurality of nearby PoAs. All the information collected in the cloud platform over different channels and network topologies are further tested utilizing the DFS, the AFC and the SAS in the one or more unlicensed bands.

The training dataset of the AI module is constructed from the measurements of the plurality of client devices and the solutions of traditional integer point optimization algorithm using the DFS. The AFC communicates with an AFC framework frequently to revise data on a plurality of incumbent receivers kept in a database, to enable dynamically determining and obliging safety contours adequate to guard Point to Point (PtP) links, and rejecting requests if emissions of a Radio Local Area Network (RLAN) exceed an interference threshold in any individual incumbent link. The SAS determines which part of the CBRS spectrum can be used by the Priority Access Licensed (PAL) tier users and Generally Authorized Access (GAA) tier users and manages the use of available spectrum among users that request access. The PAL tier users and GAA tier users are allowed to access CBRS channels when the CBRS channels are not utilized by incumbent users/services.

In accordance with another embodiment, a user-friendly dashboard is provided with a plurality of Key Performance Indicators (KPIs) to enable end-users to monitor the health of their networks. An end-user may include, but is not limited to, IT departments of operators, hotel brands and businesses.

In accordance with yet another embodiment, collaborative monitoring of end-to-end connectivity of a network is performed, by tracking bottlenecks in the path of the network and performing Border Gateway Protocol (BGP)/ Multiprotocol Label Switching (MPLS) troubleshooting at a subscriber end. The BGP/MPLS troubleshooting comprises ensuring the prefix propagation is across the network, classifying the IP blocks and benchmarking the hops by grouping subscribers.

In accordance with yet another embodiment, multi-threaded programming is implemented in case users have two or more PoAs to be connected, to minimize processing time in the analysis phase of an application. AsyncTask class is used to manage waiting processes of threads that work simultaneously and require results of an earlier thread(s) to terminate.

In accordance with yet another embodiment, users/operators are enabled to share PoAs (Wi-Fi and Private LTE/5G network) for Wi-Fi and CBRS connections, and data offloading is enabled among cellular internet connection, Wi-Fi and CBRS connections. The AI module is used to determine whether the offloading is desirable or not based on parameters such as, but not limited to, Wi-Fi interference, CBRS unit-cost rate, Number of active users, Licensed spectrum status, Costs, Guest characteristics, RSSI and Energy efficiency.

FIG. 1 is a diagram that illustrates a system for optimizing utilization and performance of one or more unlicensed bands in a network in accordance with an exemplary embodiment of the disclosure. Referring to FIG. 1, there is shown a system 100, which includes a spectrum orchestration application 102, one or more client devices 104A-104N, a central node 106 deployed on a cloud platform 108, a plurality of client devices 110A-110N and a plurality of nearby point of attachments (PoAs) 112A-112N. The system 100 further includes a wireless/cellular communication framework 114 that is used to transmit/receive messages between the one or more client devices 104A-104N and the cloud platform 108.

The spectrum orchestration application 102 comprises suitable logic and/or interfaces that, when executed by a processor, communicates with the central node 106 deployed on the cloud platform 108. The spectrum orchestration application 102 may be configured as a client device application to be installed on the one or more client devices 104A-104N for optimizing utilization and performance of one or more unlicensed bands in a network. The network may include, but is not limited to, a Wi-Fi network and a CBRS network. In accordance with an embodiment, the spectrum orchestration application 102 may be a mobile application that may be installed by both end-users and IT departments of various operators/businesses. The spectrum orchestration application 102 may also be converted to a Software Development Kit (SDK) so that various operators/businesses can integrate the SDK into their own applications. The spectrum orchestration application 102 is a tool that transmits information about Wi-Fi (such as, but not limited to, neighbor APs, channel number, RSSI, channel utilization rate, and interference), CBRS (such as, but not limited to, shared spectrum, available spectrum, channel band, and SIM card) and user preferences (related to information such as, but not limited to, minimum data rate, handover request, and offloading setup) to the cloud platform 108. The spectrum orchestration application 102 is further configured to provide user-friendly information that is optimized by the cloud platform 108 over a dashboard and is provided to end-users, operators or businesses.

The one or more client devices 104A-104N may comprise suitable logic, circuitry, interfaces and/or code that may be operable to communicate data or messages with one or more other client devices and transmit radio frequency signals when attempting to access local wireless networks. The one or more client devices 104A-104N may include, but are not limited to, personal computers (PCs), mobile devices, smart phones, laptops, personal digital assistants (PDAs), multimedia tablets, and phablets.

The plurality of nearby PoAs 112A-112N may comprise suitable logic, circuitry, interfaces and/or code that may be operable to enable the one or more client devices 104A-104N to access either a wireless network (for example, a Wi-Fi network) or a cellular network. The plurality of nearby PoAs 112A-112N may include, but is not limited to, a Wi-Fi AP or a 5G/LTE BS.

In operation, the spectrum orchestration application 102 is configured to collect RF measurements from the plurality of client devices 110A-110N and from the plurality of nearby point of PoAs 112A-112N. The RF measurements may include, but are not limited to, RSSI measurements/values, capabilities and channels. The spectrum orchestration application 102 is configured to provide a cloud-based device-centric spectrum orchestration over unlicensed bands (Wi-Fi and CBRS bands), and enable the cloud platform 108 to obtain and set optimized parameters for end-users/operators coupled with self-organizing network (SON) features, such as, but not limited to, channel/network selection, offloading, handover, network slicing, and parallel communication. The spectrum orchestration application 102 is further configured to enable a cloud processor of the cloud platform 108 to calculate an optimal transmission channel/network in the one or more unlicensed bands for one or more nearby PoAs of the plurality of nearby PoAs 112A-112N using an Artificial Intelligence (AI) module based on the RF measurements. The AI module is configured to utilize a Dynamic Frequency Selection (DFS), an Automated Frequency Coordinator (AFC) and a Spectrum Access System (SAS) to select the optimal transmission channel/network based on the data-rate result from the DFS, the AFC and the SAS.

Figure 2:
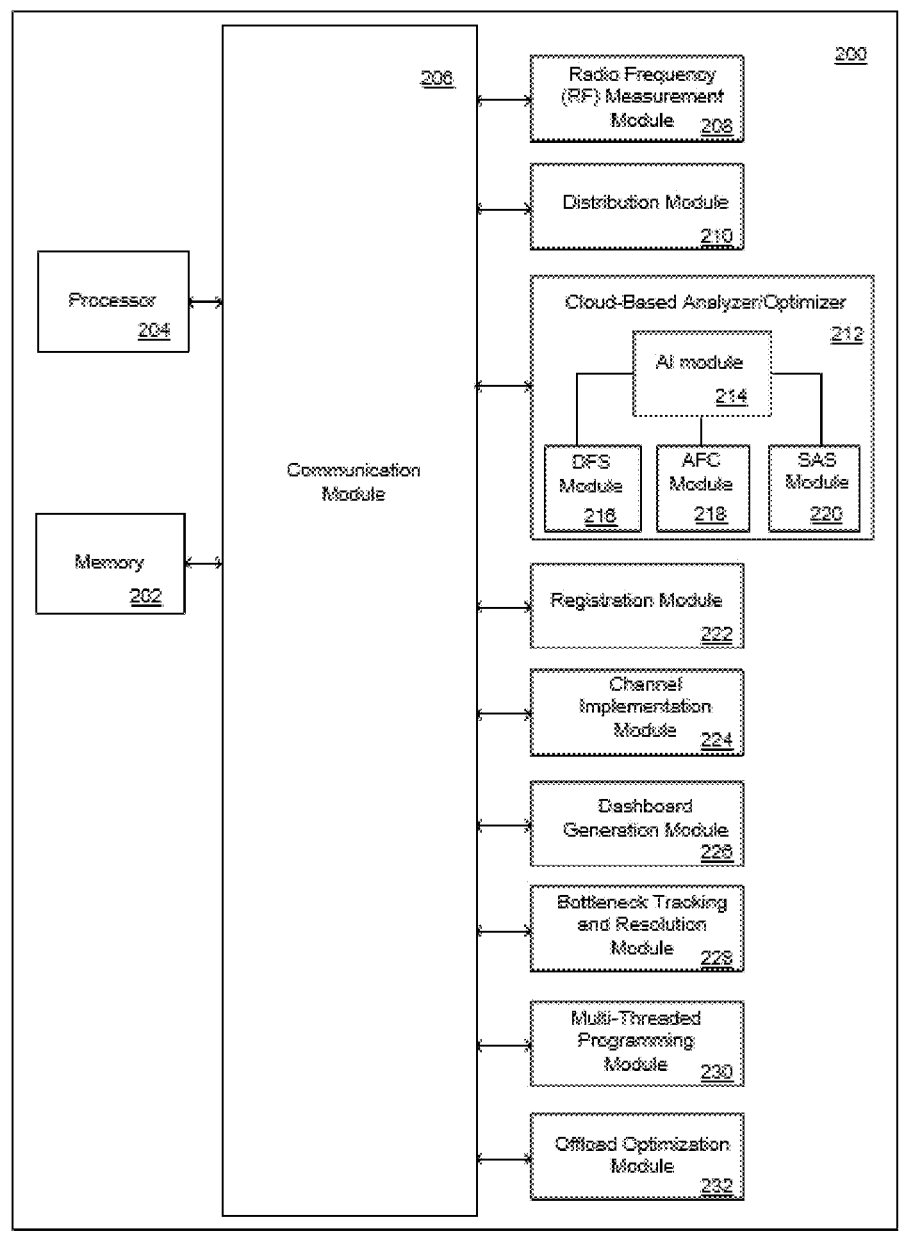
FIG. 2 is a diagram that illustrates various modules of a spectrum orchestration application for optimizing utilization and performance of one or more unlicensed bands in a network, in accordance with an exemplary embodiment of the disclosure.

FIG. 2 is a diagram that illustrates various modules of a spectrum orchestration application for optimizing utilization and performance of one or more unlicensed bands in a network in accordance with an exemplary embodiment of the disclosure. Referring to FIG. 2, there is shown a spectrum orchestration application 200, which includes a memory 202, a processor 204 communicatively coupled to the memory 202, a communication module 206, an RF measurement module 208, a distribution module 210, a cloud-based analyzer/optimizer 212, an AI module 214, a Dynamic Frequency Selection (DFS) module 216, an Automated Frequency Coordinator (AFC) module 218, a Spectrum Access System (SAS) module 220, a registration module 222, a channel implementation module 224, a dashboard generation module 226, a bottleneck tracking and resolution module 228, a multi-threaded programming module 230, and an offload optimization module 232.

The memory 202 may comprise suitable logic, and/or interfaces, that may be configured to store instructions (for example, computer readable program code) that can implement various aspects of the present disclosure.

The processor 204 may comprise suitable logic, interfaces, and/or code that may be configured to execute the instructions stored in the memory 202 to implement various functionalities of the spectrum orchestration application 200 in accordance with various aspects of the present disclosure. The processor 204 may be further configured to communicate with various modules of the spectrum orchestration application 200 via the communication module 206.

The communication module 206 may comprise suitable logic, interfaces, and/or code that may be configured to transmit data between modules, engines, databases, memories, and other components of the spectrum orchestration application 200 for use in performing the functions discussed herein. The communication module 206 may include one or more communication types and utilizes various communication methods for communication within the spectrum orchestration application 200.

The RF measurement module 208 may comprise suitable logic, interfaces, and/or code that may be configured to collect RF measurements from the plurality of client devices 110A-110N and from the plurality of nearby PoAs 112A-112N. A PoA may include, but is not limited to, a Wi-Fi AP and a 5G/LTE BS. The RF measurements may include, but are not limited to, RSSI measurements/values, capabilities and channels. The RF measurements collected from the plurality of client devices 110A-110N in the vicinity and the plurality of nearby PoAs 112A-112N are transmitted to the cloud platform 108.

The RF measurement module 208 may be further configured to report information pertaining to the plurality of nearby PoAs 112A-112N, their channels and RSSI values to the cloud platform 108 in a smart manner. The RF measurement module 208 can perform speed tests in order to determine the backhaul bandwidth when signal strength is high, and the channel is optimum. The RF measurement module 208 also determines Wi-Fi and CBRS related protocol requirements of a connected PoA for the efficient distribution of unlicensed bands. Further, the RF measurement module 208 runs in the background to report the current RF conditions and triggers the optimization when the conditions change.

The RF measurement module 208 may be further configured to mobile devices of different operating systems, computers and some other Wi-Fi devices to scan the RF environment constantly in order to report probable Wi-Fi APs for connection or offload cellular data to Wi-Fi from externally installed applications. The scan procedure covers the whole unlicensed spectrum which is divided into several channels based on country regulations. The more spectrum for the unlicensed band, the more potential for the high Wi-Fi link speed, as signal interference is caused by the transmission on the same or adjacent channels primarily.

The RF measurement module 208 may be installed on two different hardware. In an embodiment, the RF measurement module 208 may be installed as an application on any client device or station (STA). Currently, Android devices provide the channel scanning functionality from externally installed applications whereas iOS is limited to rooted devices only. In another embodiment, the RF measurement module 208 is installed in APs. The APs determine the modulation for a particular data packet based on the RSSI from the STAs to which it is connected. Usually, the APs do not deliver or stream this to the cloud platform 108 or any other software unless a specific software is installed on the AP. In addition, some APs scan the environment directly, eliminating the need of an STA for the RF measurement. The functions of the RF measurement module 208 are further demonstrated in FIG. 3.

The distribution module 210 may comprise suitable logic, interfaces, and/or code that may be configured to store and display all the PoAs such as, but not limited to, Wi-Fi APs in the vicinity, Wi-Fi APs registered to the cloud platform 108, the LTE/5G BS that it is associated with, and the neighboring BSs, on a web mapping service-integrated user interface (UI). The cloud platform 108 in conjunction with the distribution module 210 is configured to distribute the PoAs so that there is no conflict on the map and the strongest RSSI PoAs are closer to the STA. The nearby PoAs which harm the link speed of the current connection may be indicated in red color spectrum. If the nearby PoA interference is relatively less, its color transforms to green to show the impact of the interference. Further, the distribution module 210 updates the positions of the PoAs once their actual positions change or more measurements are obtained for a better positioning. A user can swipe to other regions on the map to do tests on other regions as well.

The cloud-based analyzer/optimizer 212 may comprise suitable logic, interfaces, and/or code that may be configured to calculate an optimal transmission channel/network in the one or more unlicensed bands for one or more nearby PoAs of the plurality of nearby PoAs 112A-112N using the AI module 214 based on the RF measurements received at the cloud platform 108.

The AI module 214 may comprise suitable logic, interfaces, and/or code that may be configured to utilize the DFS module 216, the AFC module 218 and the SAS module 220 to select the optimal transmission channel/network based on the data-rate result received from the DFS module 216, the AFC module 218 and the SAS module 220. An optimal transmission channel/network may include, but is not limited to, Wi-Fi channels and 5G/LTE Band 48. However, the channel changing/adjustment occurs only if the PoAs are registered to the system.

In accordance with an embodiment, the registration module 222 may be configured to perform a registration process which includes a login through submitting the PoA model and user credentials. Once the credentials are submitted for supported PoAs, the channel implementation module 224 changes the channels automatically based on the policies for channel management. In other words, users do not have to do anything else after the registration for the channel management.

The channel implementation module 224 may be configured to run in the background and changes the channel when the STA that is connected to a particular PoA has a better Wi-Fi or LTE/5G transmission channel different from the channel that is already in use. A wide range of PoA models may be supported which are used by a significant portion of the customers. The models are flexible to any brand and do not rely on a specific vendor.

Optimal channel assignment is provided for a particular PoA through centralized management of RF measurements from the STAs in the cloud platform 108 using the cloud-based analyzer/optimizer 212 and the AI module 214. The RF measurements include the RSSI measured by STAs and the channel of the transmission from the connected or the nearby PoAs, which provide the inputs to the cloud-based analyzer/optimizer 212 in order to calculate the optimal transmission channel of the connected PoAs.

The limited channel bandwidth, the interference among geographically near PoAs and limited adaptation to changes in network topology and user statistics decreases the performance of the current PoAs. For the overall efficiency, all PoAs eventually requires a single cloud platform for optimum usage. In this context, cloud-based spectrum orchestration requires the connection of PoAs to a cloud-based centralized coordinator, periodic collection of user statistics, and optimization of parameters of the PoAs. A periodic collection of user statistics allows the analysis of network dynamics, which is useful for the dynamic adaptation of network parameters at high user density. Historical user data-based decisions allow achieving optimal performance at high PoA density through forecasting and exploiting potential beneficial actions. For instance, if no user is connected to a PoA at certain times during the day, the corresponding PoA does not have to be included in the optimization. Further, remote cloud-based management of network parameters also allows end-users, operators, or businesses to remotely adapt the optimal settings.

With the cloud-based analyzer/optimizer 212, registered PoA lists are stored on the cloud platform 108 and effective spectrum as a service approach (via the DFC module 216, the AFC module 218, the SAS module 220 spectrum brokerage, and sub-channel sharing), and secure password sharing are performed.

Furthermore, all the information collected in the cloud platform 108 is tested over different channels and network topologies utilizing different algorithms (DFS for 2.4 and 5 GHz bands, AFC for 6 GHz bands and SAS for 3.5 GHz CBRS bands) in the unlicensed wireless bands (2.4, 3.5, 5 and 6 GHz), and then the optimal channel and network interface are calculated per user.

In accordance with an embodiment, the cloud platform 108 may be configured to utilize measurements under different RF conditions to maximize the overall Wi-Fi and CBRS performance by solving a complex optimization problem with easily measured variables using the AI module 214. The architecture considers all PoAs and nearby historical measurements to determine the channel update frequency and decision making. Functionalities of the DFS module 216 are further illustrated in detail in conjunction with FIG. 4 and FIG. 5.

In order to protect the incumbent operators in the 6 GHz, that is, microwave links from MNOs, utilities, public safety and transportation as well as broadcast auxiliary service and cable television relay service, the FCC requires the use of the AFC module 218. In this context, unlicensed sub-bands between 5925-6425 MHz and 6525-6875 MHz are going to be controlled by the AFC module 218 using an AFC framework. The other two sub-segments are expected to be restricted for low-power and indoor-only usage without any database management requirement.

Since incumbent services in U-NII-5 and U-NII-7 bands are fixed, FCC plans to let unlicensed use at standard power outdoors and indoors subject to an AFC framework. The agency predicts the AFC framework to be a simple database, which will be easy to apply.

AFC exists primarily for outdoor applications but will also apply for higher power indoor usage such as in large warehouses or residential multi-dwelling units. APs will require a geolocation technology and some way to communicate to the AFC module 218 outside of the protected bands. The AFC will be required for indoor higher power operation above Low Power Indoor (LPI) limits and indoor higher power mobile clients.

Links such as incumbent PtP microwave and fixed-satellite service (FSS) earth stations are basically immobile and extremely directional, and rarely change their positions or operational parameters. Similar to the TV-Bands Database, the AFC framework is expected to enforce safety regions throughout static incumbent links according to the incumbent-provided licensing data, which is anticipated to be frequently updated. An allowance to run a Wi-Fi AP at a locale is hence a one-to-one computation, which will be simply confirmed according to the incumbent data.

The AFC module 218 implemented in the cloud platform 108 communicates with the AFC framework frequently to revise data on incumbent receivers kept in a database provided by the FCC. In this way, it will be possible to dynamically determine and oblige safety contours adequate to guard PtP links, rejecting requests to run where the RLAN's emissions exceed an interference threshold into any individual incumbent link. The AFC framework allows incumbent services to add sites or adjust their networks, due to commission databases that remain to be revised by incumbents and RLAN channel permissions expire automatically if not renewed over a time provided in the FCC's rules. In case there is available bandwidth not utilized by the incumbent services, then the cloud platform 108 allows end-devices and assisted operators/businesses to utilize the available bandwidth.

Furthermore, CBRS deploys a three-tier priority scheme and lets numerous end-devices to use the 3.5 GHz spectrum together in a fair and efficient way, through sensing and coordination.

As in the AFC framework, incumbent services are first to allocate any CBRS spectrum whenever requested at sites assigned by the FCC. CBRS implements exclusion zones to be able to protect accesses for incumbents such as satellite providers and terrestrial military radar stations. In these zones, access for PAL and GAA tiers is not permitted, and hence incumbents have the exclusive access to the allocated spectrum. However, due to propagation characteristics of the 3.5 GHz band and limited number of incumbents, these zones cover just a minor part of the terrain.

On the other hand, in coaster areas or regions, incumbent users may include military ships, which are mobile (not in fixed sites). The Environmental Sensing Capability (ESC) is a network of sensors that detects incumbent activity in the CBRS band along the coast and transmits this information to SAS module 220 to determine which part of the CBRS spectrum can be used by the remaining two tiers: PAL and GAA. Therefore, PAL and GAA users are not permitted to allocate CBRS channels while they are in use by incumbent users.

The SAS module 220 implemented on the cloud platform 108 manages the use of available spectrum among users that request (or can request) access. In case there is available bandwidth not utilized by the incumbent services, then the cloud platform 108 allows end-devices and assisted operators/businesses to utilize the available bandwidth. The SAS module 220 consents access for PAL users in sites where there is no incumbent activity, then releases the remaining spectrum to GAA registered users that an access is expected to be requested by themselves through the cloud platform 108.

The cloud platform 108 is configured to manage authorization from the SAS module 220 first for both PAL and GAA users that want to or are allowed to transmit. A PAL gives licensees priority over GAA users, but not exclusive access to a CBRS channel. In a similar manner, GAA users do not need a license, but do not have unconstrained access as they would have in unlicensed bands.

The SAS module 220 within the cloud platform 108 runs in real-time, since PAL and GAA spectrum availability and demand would differ over time. In practice, it is expected that the availability of CBRS spectrum to local users will be reliable and stable through time in most environments, especially in enterprises that have control over their premises and, hence, of the deployed equipment.

FCC framework encourages the coexistence in order to ensure competition and fair access. In this context, there might be more than one ESC and SAS at a site. The SAS module 220 deployed within the cloud platform 108 checks for the existence of other SASs in the vicinity of an end-user, and handles accesses in an order through message exchanges between SAS modules (making use of the information provided by the ESCs) in case of multiple SAS deployment at a site to ensure consistent spectrum allocation without conflicts.

In various embodiments, the cloud platform 108 may be configured to run three different algorithms (DFS, AFC and SAS) to determine the optimal channel/network whenever a request from an end-user or operator is initiated. Selection of the channel/network is performed automatically by the cloud platform 108 based on the data-rate result of each algorithm. Yet, in some embodiments, it is also possible for the user/operator to handle the channel/network selection based on user preferences.

Each user, operator, business or venue owner can set their own parameters that reflect their own Service Level Agreements (SLAs) or their Quality of Experience (QoE) objectives through a dashboard provided by the dashboard generation module 226 of spectrum orchestration application 200. The settings page provides easy to change threshold levels for each of the eight key parameters: fidelity, speed test, data rate, router placement, coverage, Wi-Fi/CBRS speed, local latency and number of connected devices. In this way, user or operator preferred channel/network assignment is also possible.

Referring to FIG. 2, the spectrum orchestration application 200 transfers the information about the network to cloud platform 108, and the optimization of the network is provided to the user as a result of the information received from the cloud platform 108. Information processed in the cloud platform 108 is also presented to the user as a user-friendly dashboard via the dashboard generation module 226.

The dashboard generation module 226 may comprise suitable logic, interfaces, and/or code that may be configured to provide a user-friendly dashboard with the KPIs which IT departments of operators, hotel brands or businesses keep track of in order to monitor the health of their networks. These KPIs include, but need not be limited to, the following:

Active users: This parameter represents the number of devices that are active in the network including, but not limited to, smartphones, laptops, printers and Internet-of-Things (IoT) devices. This metric provides a high-level view of how crowded the network is at a given point in time.

Routers Detected: This metric represents the numbers of neighboring Service Set identifiers (SSIDs) that spectrum orchestration application 102 detects through the scanning of neighboring APs via RF measurement module 208. This can be a good indicator of how busy the RF environment is, in a given area and period of time.

Measurements: Through a scan of neighboring SSIDs, RF measurement module 208 generates a number of measurements including speed test and latency.

Fidelity: The signal-to-noise ratio (SNR) compares the level of the Wi-Fi and CBRS signal to the level of background noise, sharing for airtime and contention. Fidelity is a measure that is used to show quality of the Wi-Fi connection with respect to a received signal strength against neighboring interferers.

Speed test: This parameter measures the end-to-end throughput from a client device to the system server.

Data Rate: This parameter provides the maximum physical layer rate (theoretical value) that a client device is allowed to transmit data at a given instance. However, in the real world, there will be interference and losses which will result in a lower bit rate. The throughput is seen as a practical value that the wireless link can achieve.

Wi-Fi Health: Modem health combines how well a modem is placed and how much coverage capacity the modem has.
Router placement: Router location (CPE—Customer Premise Equipment) determines how well a client device receives its signals.
Coverage: This parameter indicates whether there is shortage in coverage.
Wi-Fi/CBRS Speed: This parameter is the throughput between the client device and the PoA.
Local Latency: This parameter represents the delay between the client device and the PoA.
Number of Connected Devices: This parameter indicates how many Wi-Fi devices are connected to the PoA at a given instance.

Through the dashboard generation module 226, per customer insight is provided as a subscriber-dashboard and with appropriate Application Programming Interfaces (APIs) to be integrated into the customer's customer relationship management (CRM). Subscriber-dashboard is a first stop for the contact center operation to provide insights as well as AI-based recommendations.

The spectrum orchestration application 200 is also configured to collaboratively monitor the end-to-end connectivity to ensure there is no black hole in the network and the transit path works flawlessly via the bottleneck tracking and resolution module 228.

The bottleneck tracking and resolution module 228 may comprise suitable logic, interfaces, and/or code that may be configured to track the bottlenecks in the path and also perform BGP/MPLS troubleshooting from a customer's side and ensure the prefix propagation is across the network. The bottleneck tracking and resolution module 228 also classifies the IP blocks and benchmarks the hops by grouping the subscribers.

The multi-threaded programming module 230 may comprise suitable logic, interfaces, and/or code that may be configured to minimize processing time in the analysis phase of the application in case users have more than one PoA to be connected. In this regard, AsyncTask class is used to manage waiting processes of threads that work simultaneously and require results of an earlier thread(s) to terminate. AsyncTask class enables processes that run on different threads in the background to integrate into the main thread that run on foreground with ease. Thus, the drawbacks of a multi-threaded structure, in terms of processes waiting for one another is also handled, making use of the AsyncTask. As an example, a multi-threaded flowchart of the network selection, in case there are two available PoAs, is illustrated in FIG. 6.

The offload optimization module 232 may comprise suitable logic, interfaces, and/or code that may be configured to enable users to share PoAs (Wi-Fi and Private LTE/5G network) for Wi-Fi and CBRS connections, and performs data offloading among cellular internet connection, Wi-Fi and CBRS connections. The AI module 214 is used to determine whether the offloading is desirable or not based on parameters such as, but not limited to, Wi-Fi interference, CBRS unit-cost rate, Number of active users, Licensed spectrum status, Costs, Guest characteristics, RSSI and Energy efficiency.

The primary contribution of the offload optimization module 232 is the formation of architecture to enable data offloading among cellular internet connection, Wi-Fi and CBRS. The cloud platform 108 manages PoAs to broadcast a password free Wi-Fi to which only mobile application logged users can connect through authorizing the user Media Access Control (MAC) addresses, sharing the available bandwidth between host and the mobile application users.

Offloading transfers the data flow from licensed spectrum to unlicensed spectrum (Wi-Fi and CBRS). The shift from the licensed to unlicensed spectrum is not always a wise decision since the interference in the unlicensed spectrum might cause significant Quality of Service (QoS) reduction, causing customer dissatisfaction and data delivery failures. On the other hand, there should be enough demand in the licensed spectrum to offload or the unlicensed spectrum should be significantly idle to make offloading practically desirable. The AI model 214 is utilized to determine whether the offloading is desirable or not.

The offloading mechanism is different for both personal users and AP owners. The AP owners, in that case, have the option to accept or reject the connection request based on any personal reason. For the case of the operator, the user does not have to request Wi-Fi or CBRS access from the operator PoAs. The mobile application detects any operator PoA and starts the association if the AI module 214 determine that the offload is desirable. The inputs to the AI module 214 to aid in offload optimization decisions are as follows:

Wi-Fi interference: The Wi-Fi interference can be measured by any metric including SNR, number of nearby APs, or channel utilization. Based on the interference, the link speed of the Wi-Fi connection reduces significantly. Once the link speed is below a threshold, the offload becomes undesirable.
CBRS unit-cost rate: CBRS provides an exclusive LTE/5G network in uncrowded spectrum. It is deployed with dedicated equipment that increases device and data capacity. Therefore, the data rate is mostly expected to be better than Wi-Fi or cellular network. However, since it may be run by another private LTE/5G operator, offloading cost per unit-throughput must be known prior to offloading.
Number of active users: The number of active users is an important parameter to be considered for offload. An AP must address the request of the connected STAs. Once the number of users is too high, the data delivery rate becomes slow due to excessive number of users and collisions, and hence the QoS reduces.
Licensed spectrum status: Licensed spectrum is already purchased by the operator and therefore its underutilization may result in additional inefficiency. Once there is no significant demand in the licensed spectrum, the offloading becomes an issue since the interference probability in the licensed spectrum is relatively less. Thus, more data delivery might be possible.
Costs: The operator must maintain the base stations already. For the offloading, the operator must install access points which require support constantly. The service from an AP has a cost likewise licensed spectrum data delivery.
Guest characteristics: Not all STAs provide significant benefit to an operator when their data is offloaded. The primary objective of the operator is to reduce the costs and increase the QoS of the customers. Via the mobile application, download patterns of the STAs are tracked and high downloading guests are more likely to be offloaded to reduce the burden on the licensed spectrum. However, the selection of the guests to offload is a function of other inputs as well.

Other than the aforementioned actual parameters, following parameters can also be considered as input to the AI algorithm of the AI module 214:
RSSI: Low Received Signal Strength of STAs leads to increased packet loss rate, which also leads to higher back-off durations and hence inefficient channel utilization. This may result in Wi-Fi STAs to transmit/receive fewer packets compared to the cellular networks.

Energy efficiency: Power consumed in each wireless state (transmit, receive, idle and doze) is an important indicator for the energy efficiency. Although Wi-Fi-based communication is mostly more energy efficient than those cellular-based communications for the unit-throughput ratio, excessive number of users, collisions and packet errors may cause Wi-Fi network to consume more power than the cellular network.

Consequently, in case a mobile operator decides to offload their cellular data to the Wi-Fi or CBRS network, the offload optimization module 232 automatically allows its users to connect to Wi-Fi or CBRS network without any consent. In this way, a mobile operator always has an alternative option to transfer the data in the cheapest and most reliable way while using any PoA available.

Figure 3:
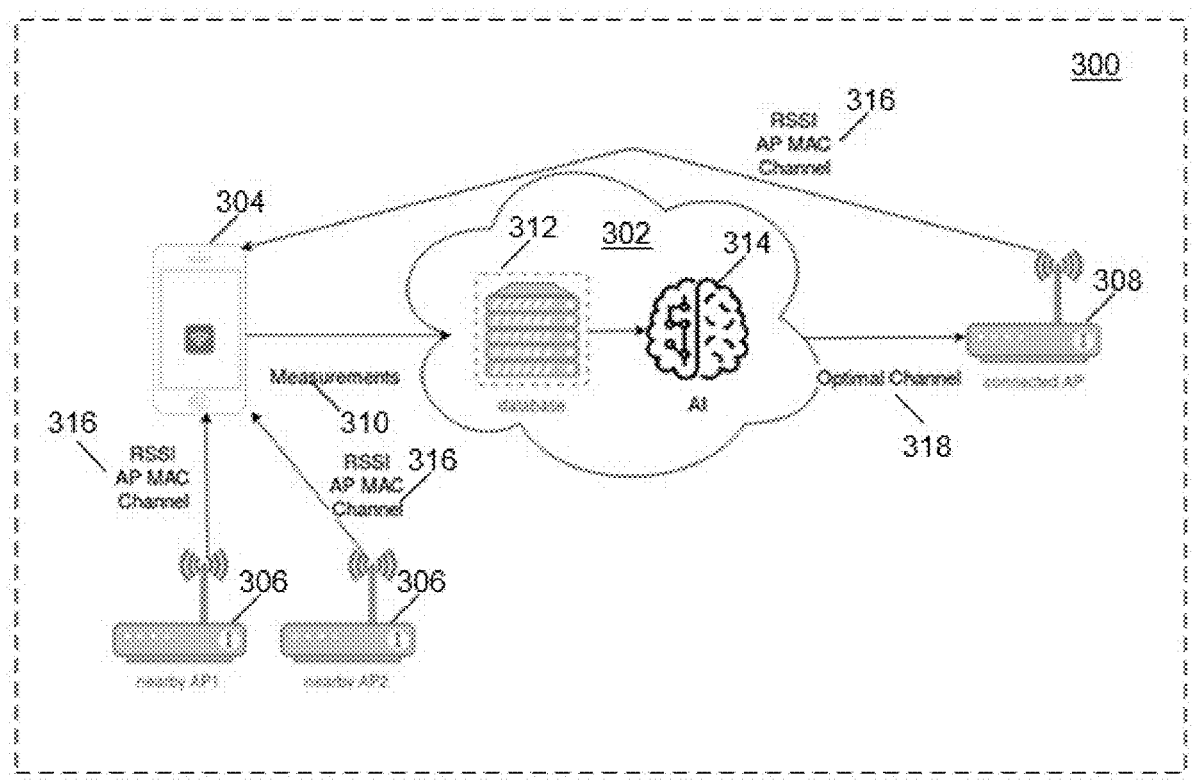
FIG. 3 is a diagram that illustrates functions of a Radio Frequency (RF) measurement module of the spectrum orchestration application and measurements in a cloud platform, in accordance with an exemplary embodiment of the disclosure.

FIG. 3 is a diagram that illustrates functions of an RF measurement module of the spectrum orchestration application and measurements in a cloud platform in accordance with an exemplary embodiment of the disclosure. Referring to FIG. 3, there is shown an implementation 300, which includes a cloud platform 302, an STA 304, a plurality of nearby APs 306 (nearby AP1 and nearby AP2), and a connected AP 308 which is connected to the STA 304.

The cloud platform 302 is configured to collect and process measurements (RF measurements) 310 received from the RF measurement module 208 (not shown in the figure). The cloud platform 302 comprises a database 312 for processing the collected measurements 310 using an AI module 314 present in the cloud platform 302.

The RF measurement module 208 delivers information 316 such as, but not limited to, the nearby AP MAC, RSSI from the corresponding nearby APs 306, the transmission channel for each of the nearby APs 306 at each scan and for the connected AP 308, to the cloud platform 302. Once the measurements from several STAs are stored on the database 312 of the cloud platform 302, the measurements are evaluated and processed by the AI module 314, thus making centralized decision-making feasible.

The measurements in the cloud platform 302 are updated once a new set of measurements is available from the STA 304 in order to reflect the latest RF environment in the calculation of the optimality in real-time.

In an instance, a Wi-Fi network might lack the RF measurements if the connected STAs have iOS only. In order to avoid the issue, an Android device which is a member of the system uploads RF measurements when it meets an AP with no recent measurements as if it is a part of the network. The AI module 314 then calculates an optimal channel 318 in one or more unlicensed bands for the connected AP 308 based on the measurement of an Android device which is not even connected to itself.

Figure 4:
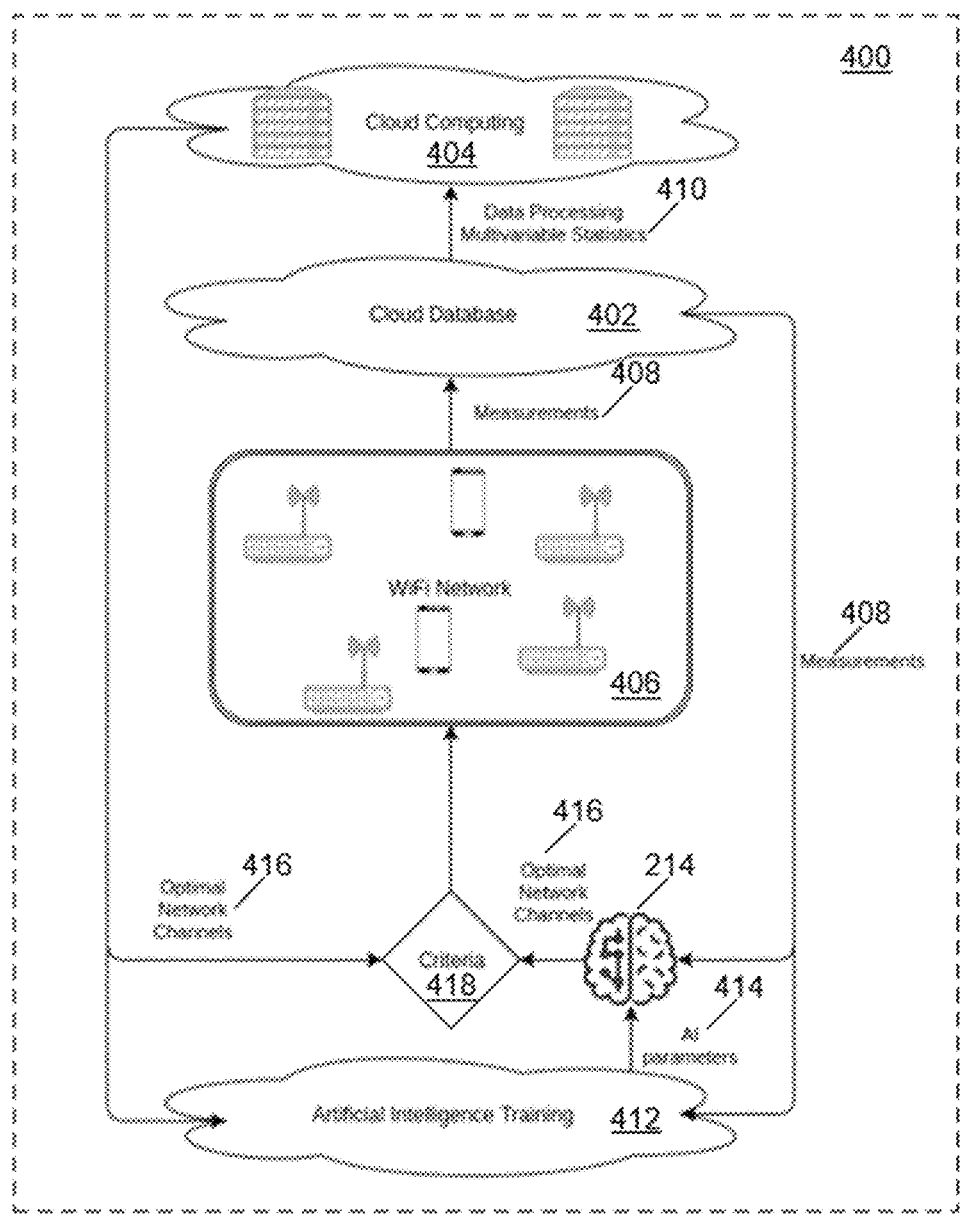
FIG. 4 is a diagram that illustrates training and implementation of an AI module of the spectrum orchestration application, in accordance with an exemplary embodiment of the disclosure.

FIG. 4 is a diagram that illustrates training and implementation of an AI module of the spectrum orchestration application in accordance with an exemplary embodiment of the disclosure. Referring to FIG. 4, there is shown an implementation 400 for enabling the training of the AI module 214 of the spectrum orchestration application 200. The implementation 400 includes a cloud database 402, a cloud computing platform 404 and a Wi-Fi network 406.

The cloud database 402 is configured to receive and store measurements (RF measurements) 408 from devices in the Wi-Fi network 406. The Wi-Fi network 406 may include, but is not limited to, one or more client devices, one or more Wi-Fi APs or routers and one or more PoAs.

The measurements 408 stored in the cloud database 402 are transmitted to the cloud computing platform 404. The cloud computing platform 404 is configured to perform data processing and multivariable statistics 410 on the measurements 408 collected at the cloud computing platform 404.

AI training 412 is then performed using the measurements 408 stored in the cloud database 402 and data computations received from the cloud computing platform 404. Trained AI parameters 414 are then fed to the AI module 214 for calculation of optimal network channels 416 for devices in the Wi-Fi network 406 based on a set of criteria 418.

AI algorithms of the AI module 214 replace the traditional integer programming optimization in real-time in order to reduce the computational load at high density networks. The AI algorithms are advanced supervised learning methods which require a representative set of data for the estimation of AI parameters (training) in order to be used for different scenarios. An input vector and a corresponding output vector is necessary in order to obtain the AI parameters.

In this particular case, the training dataset of AI is constructed from the measurements of STAs and the solutions of traditional integer point optimization algorithm as illustrated in FIG. 4.

An exemplary training data set output vector construction is illustrated as follows.

Both AI and traditional integer optimization aim maximizing the overall signal quality within the network in order to increase the Wi-Fi link speed for the higher data rate. The output vector of AI for this particular case is the optimal transmission channel and is calculated by an integer programming-based optimization problem as in Eq. 1:

$$\text{Max}_{CH_i} SINR_i = \frac{RSSI_i}{\sum_{j=1, j \neq i}^{N} RSSI_j \cdot O(i,j) + \text{Noise}} \quad CH_i \subset CH \quad \text{(Eq. 1)}$$

where $SINR_i$ is the SINR of a particular STA which is connected to $i^{th}$ AP; $RSSI_i$ is the RSSI from the $i^{th}$ AP; $O(i,j)$ is the fractional bandwidth overlap between transmission channels of $i^{th}$ and $j^{th}$ APs. $O(i,j)$ is zero for non-overlapping channels only and independent of the network structure. $O(i,j)$ includes channels both from 2.4 GHz and 5 GHz band. $CH_i$ is the transmission channel of the $i^{th}$ AP; CH is the available set of channels for a particular country where the optimization is performed.

The solution of Eq. 1 becomes computationally and theoretically challenging as the number of APs increase. Usually, heuristic integer programming algorithms are incorporated to fasten the computations. Those integer programming algorithms eventually deliver optimal or sub-optimal transmission channels for particular APs under pre-uploaded measurements. The AI algorithm exploits the complex interactions between those measurements and optimal transmission channel calculation from Eq. 1.

A high amount of data is required in order to represent a wide range of network conditions and thus Eq. 1 must be solved for each case, which is computationally costly. On the other hand, this is a one-time process and needs to be updated when AI performance is below a threshold.

An exemplary training data set input vector construction is illustrated as follows.

The predictions of AI are more accurate if the training set covers a whole data range with adequate number of layers and training time. The training of AI needs a large number of data points from which AI parameters are calculated. A typical AI formulation is given by:

$$y = f_1(p_1 \cdot f_2(p_2 \cdot U + p_3) + p_4) \quad \text{(Eq. 2)}$$

where $f_1$ is the output function. Usually softmax function is used in order to calculate the probabilities of outputs when classification is necessary as in the case of Wi-Fi channels. $f_2$ is the activation function and usually tanh or sigmoid is preferred. $p_{1-4}$ are the parameters (matrices and vectors) of the AI. The parameters are updated once a statistically new measurement is available, forcing AI to evolve by capturing new patterns in the data. The performance of AI gets higher when its parameters are estimated from a high number and statistically significant measurements. U is the vector of the input variables which include the measurements from the RF environment. y is the vector or probabilities of channels.

The construction of U is a challenging task since Wi-Fi networks have high complexity with mobility of STAs, different Wi-Fi protocols and external RF disturbances. In accordance with an embodiment of the disclosure, a practical U architecture is provided that includes the impact of crucial and easily measurable network variables which include RSSIs from nearby APs and their transmission channels. Other easily measurable variables can be included in the derivation, however, current variables show satisfactory performance in the calculations.

Figure 5:
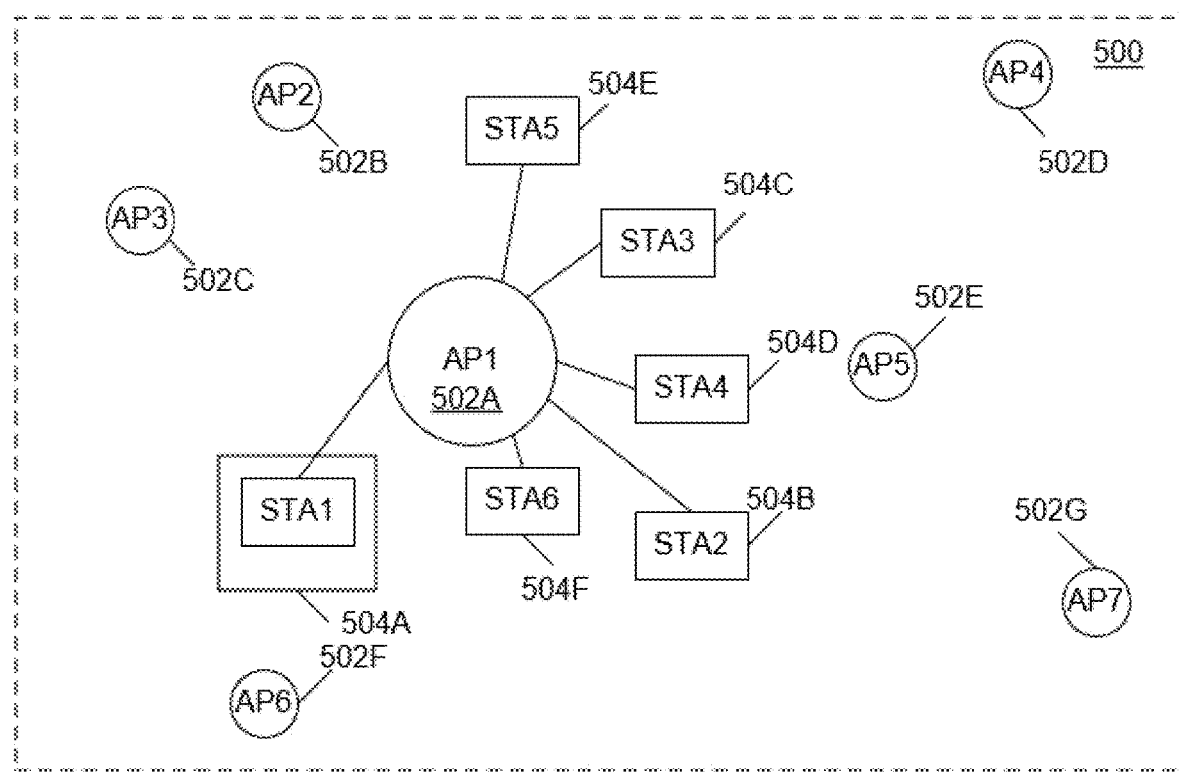
FIG. 5 is a diagram that illustrates an example of a typical network, in accordance with an exemplary embodiment of the disclosure.

FIG. 5 illustrates an example of a typical network. Referring to FIG. 5, there is shown a Wi-Fi network 500, which includes 8 APs 502A-502G (also referenced as AP1, AP2, AP3, AP4, AP5, AP6 and AP7 respectively) and 6 STAs 504A-504F (also referenced as STA1, STA2, STA3, STA4, STA5, and STA6 respectively). AP2, AP3, AP4, AP5, AP6 and AP7 and the 6 STAs 504A-504F are all connected to AP1 502A. The numbers of APs and STAs are subjected to change both due to mobility of the STAs and the density of the APs.

Considering the implementation in FIG. 5, a vector U has 49 elements, wherein the size of the vector U is calculated from:

$$\text{dimension}(U) = (NUM_{STA} + 1) \cdot NUM_{AP} \quad \text{(Eq. 3)}$$

where $NUM_{STA}$ and $NUM_{AP}$ are the number of STAs and APs respectively.

The vector U contains the RSSIs from the connected and the nearby APs in addition to the transmission channels of the APs. The order of the elements can easily be shuffled. Each STA contributes with $NUM_{AP}$ elements to U. The contribution from the $1^{st}$ STA (first 7 elements of vector U) is given by:

$$[RSSI_{11} \; RSSI_{61} \; RSSI_{62} \; RSSI_{63} \; RSSI_{64} \; RSSI_{65} \; RSSI_{66}] \quad \text{(Eq. 4)}$$

where $RSSI_{11}$ is the RSSI from the connected AP ($AP_1$) to $STA_1$; $RSSI_{61}$-$RSSI_{66}$ are the RSSIs from the $6^{th}$ AP ($AP_6$) to $STA_1$ to $STA_6$. In this network architecture, the $AP_6$ contributes here since $STA_1$ gets highest RSSI from APs apart from the connected AP, making $AP_6$ the pivot for $STA_1$.

Similarly, the contribution from the $STA_2$, which are the second 7 elements of U, is given by:

$$[RSSI_{12} \; RSSI_{51} \; RSSI_{52} \; RSSI_{53} \; RSSI_{54} \; RSSI_{55} \; RSSI_{56}] \quad \text{(Eq. 5)}$$

where $RSSI_{12}$ is the RSSI from the connected AP ($AP_1$) to $STA_2$; $RSSI_{51}$-$RSSI_{56}$ are the RSSIs from the $5^{th}$ AP ($AP_5$) to $STA_1$ to $STA_6$. In this case, $AP_5$ delivers the highest RSSI signal to $STA_2$ apart from the connected AP ($AP_1$) by looping over all STAs.

Eq. 4 and Eq. 5 delivers 14 elements from 2 STAs. Overall, 6 STAs deliver 42 elements. The last 7 elements are calculated from:

$$[CH_1 \; CH_6 \; CH_5 \ldots] \quad \text{(Eq. 6)}$$

where $CH_1$ is the transmission channel of the connected AP; $CH_6$ is the transmission channel of the pivot AP of $STA_1$; $CH_5$ is the transmission channel of the pivot AP of $STA_2$.

The above procedure results in $(NUM_{STA+1})NUM_{AP}$ elements which represent overall network conditions with easily measurable and practical network variables.

Once U is available training data, the AI mathematically takes U as input and calculates the optimum transmission channel of the connected AP ($AP_1$ in this case) through Eq. 7.

$$AI(U) = CH_1^o \quad \text{(Eq. 7)}$$

where $CH_1^o$ is vector of probabilities of optimum transmission channel of $AP_1$. The index with maximum probability is the optimal transmission channel of $AP_1$, $CH_1^\gamma$. In the perfect prediction case, $CH_1^\gamma$ is the value obtained from the traditional integer programming optimization.

In practice, the training the data set contains high number of U vectors which reflects the current transmission channels and the signal powers, and optimum transmission channel of a particular AP which is calculated through the traditional optimization algorithm. The optimization algorithm integrates over probable channels of the particular AP and calculates SINR (Signal to interference plus noise ratio) for each transmission channel. The maximum SINR resulting transmission channel is $C_1^o$ whereas AI delivers the result through matrix multiplications as in Eq. 2. Thus, the AI can learn the relationship between the transmission channels at different signal powers and optimum transmission channel.

The parameters in Eq. 1 have a well-defined dimension and needs a convenient size of input vector, which hinders the potential applications when the number of STAs and APs change from the originally trained dimensions. In order to deal with this issue, two sub-algorithms are defined as follows:

Less STAs than desired: Each STA in a network uploads the RF measurements to cloud platform 108 for centralized computations. When the number of STAs is less than the designed AI, the measurements of a particular STA are duplicated under a newly defined pseudo-STA. This pseudo-STA has exactly the same measurements with its clone. The generation of pseudo-STAs are continued until desired number of STAs are obtained. Once the STA number reaches the desired value, the input vector can be formulated regularly.

For a better performance, low-RSSI STAs are more convenient candidates for the duplication. Once they are preferred for duplication, AI module 214 assigns more weight on them while calculating the optimum transmission channel, which in turn puts more emphasis on low data rate gaining STAs.

More STAs than desired: Desired STAs can be selected randomly. A wiser choice is the selection of low-RSSI STAs since usually high-RSSI gaining STAs already have high data rates.

The primary advantage of AI applications in the channel assignment problem is the computational speed over traditional optimization methods which are studied deeply with development of many heuristic optimization algorithms. Current simulations demonstrate that, in a dense AP scenario which is above 1600 APs/km², optimal transmission channels of all APs are calculated by the AI module 214 with a rate of 1.5 sec/km² on an i7-processor PC. The total theoretical data rate is increased by 45% on the average whereas it is 50% with traditional optimization methods. While AI module 214 results in a similar performance signal quality increase, the computation time is reduced by 5000 times.

Figure 6A:
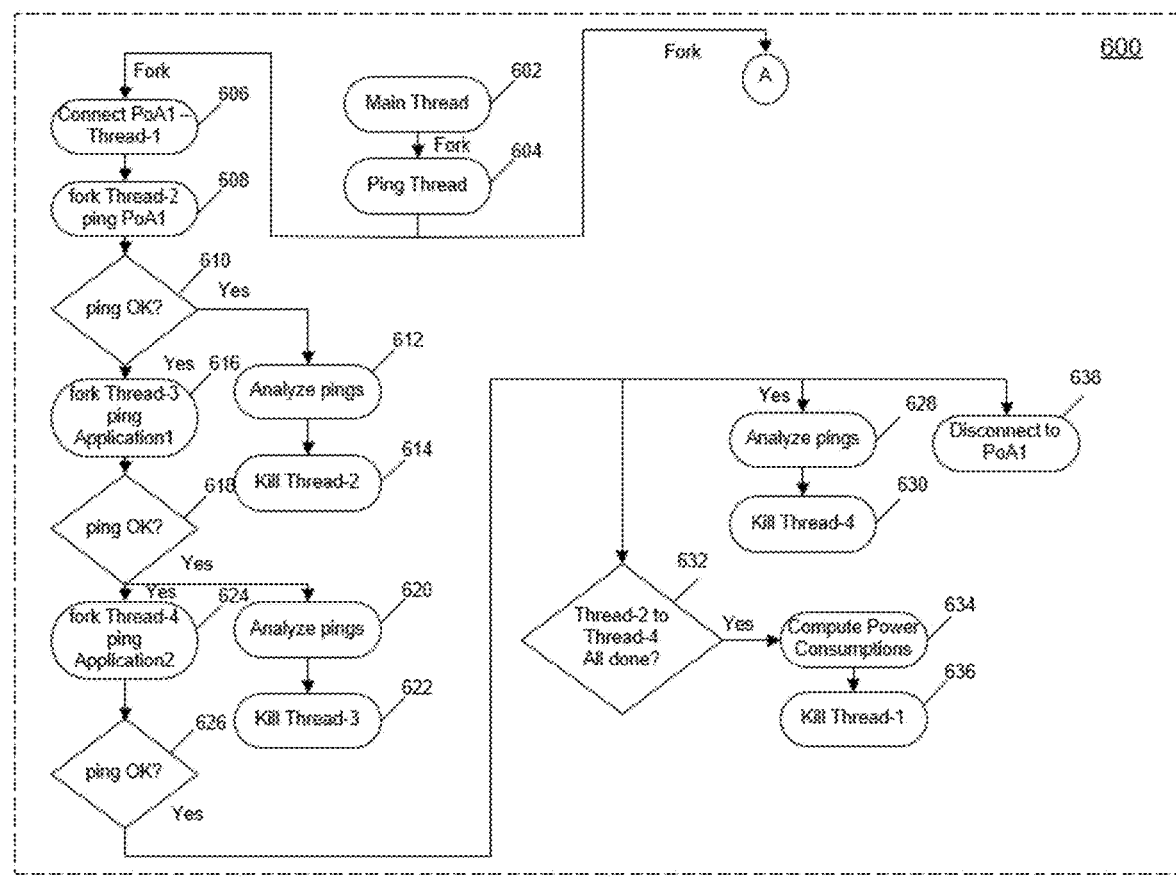
FIG. 6A and FIG. 6B collectively is a flowchart that illustrates a method for multi-threaded programming depicting ping transmissions when there are two available point of attachments (PoAs), in accordance with an exemplary embodiment of the disclosure.
Figure 6B:
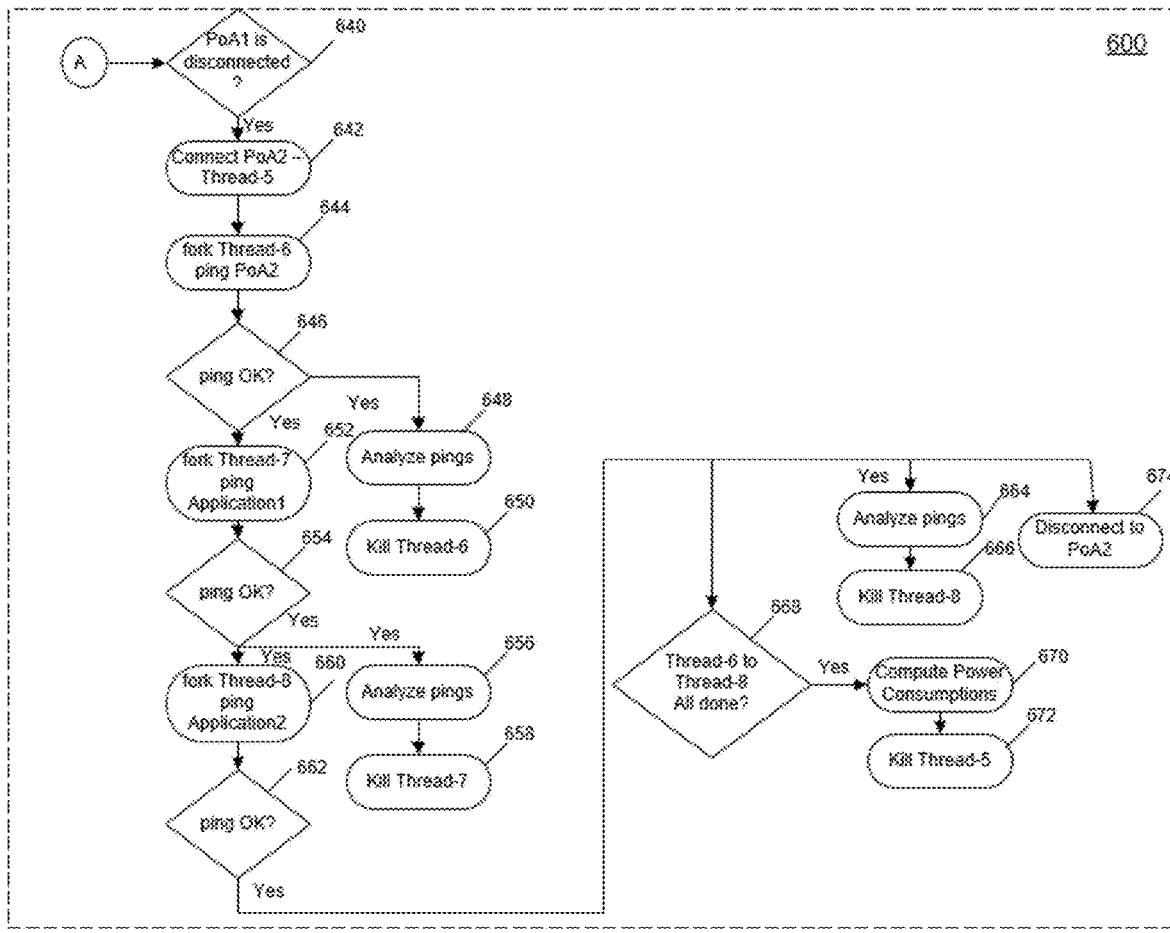

FIG. 6A and FIG. 6B collectively is a flowchart that illustrates a method for multi-threaded programming depicting ping transmissions when there are two available PoAs, in accordance with an exemplary embodiment of the disclosure. Referring to FIG. 6A and FIG. 6B, there is shown a flowchart 600 for multi-threaded programming executed in the multi-threaded programming module 230 for a proposed network selection application in case there are only two available PoAs (for example, APs).

Referring to FIG. 6A, at 602, a Main Thread initiates the process. At 604, a fork process launches a Ping Thread which initiates the ping transmissions.

At 606, PoA1 is connected to Thread-1. At 608, the fork process launches a Thread-2 which handles ping transmissions to PoA1 at 610 and 612. Thereafter, at 614, Thread-2 is killed or terminated.

At 616, the fork process launches Thread-3 which handles ping transmissions to Application1 (for example, a Facebook server). At 618 and 620, ping transmissions for Application1 are handled by Thread-3 in the analysis of PoA1. Thereafter, at 622, Thread-3 is killed or terminated. Whenever these ping transmissions are done, at 624, Thread-4 is created and ping transmissions for another web application, Application2 (for example, a Twitter server) are handled at 626 and 628. Thereafter, at 630, Thread-4 is killed.

While Thread-4 works on Application2 pings, Thread-3 concurrently analyzes ping results of Application1 coming from the Linux terminal commands, and computes average Round Trip Times (RTTs) and makes the system ready for the analysis.

While Thread-4 works on Application2 pings, Thread-3 and Thread-2 can concurrently analyze the ping results of the PoA1. However, Thread-4 is never created before Thread-3 finishes the ping transmissions. In this way, simultaneous ping transmissions for two different web applications (i.e. Application1 and Application2 ) are prevented. In fact, simultaneous ping transmissions for more than one web application results in higher average RTT results than expected, which means inaccurate computations.

Moving on, at 632, it is checked if Thread2, Thread3 and Thread4 have completed execution. Then at 634, power consumptions associated with the thread executions are computed and at 636, Thread-1 is killed or terminated. Then, at 638, PoA1 is disconnected.

Referring to FIG. 6B, at 640, it is determined if PoA1 is disconnected. At 642, PoA2 is connected to Thread-5. At 644, the fork process launches a Thread-6 which handles ping transmissions to PoA2 at 646 and 648. Thereafter, at 650, Thread-6 is killed or terminated.

At 652, the fork process launches Thread-7 which handles ping transmissions to Application1. At 654 and 656, ping transmissions for Application1 are handled by Thread-7 in the analysis of PoA1. Thereafter, at 658, Thread-7 is killed. Whenever these ping transmissions are done, at 660, Thread-8 is created and ping transmissions for Application2 are handled at 662 and 664. Thereafter, at 666, Thread-8 is killed.

While Thread-8 works on Application2 pings, Thread-7 concurrently analyzes ping results of Application1 coming from the Linux terminal commands, and computes average Round Trip Times (RTTs) and makes the system ready for the analysis.

While Thread-8 works on Application2 pings, Thread-7 and Thread-6 can concurrently analyze the ping results of the PoA2. However, Thread-8 is never created before Thread-7 finishes the ping transmissions. This way, simultaneous ping transmissions for two different web applications (i.e. Application1 and Application2 ) are prevented.

At 668, it is checked if Thread6, Thread7 and Thread8 have completed execution. Then at 670, power consumptions associated with the thread executions are computed and at 672, Thread-5 is killed or terminated. Then, at 674, PoA2 is disconnected.

Figure 7:
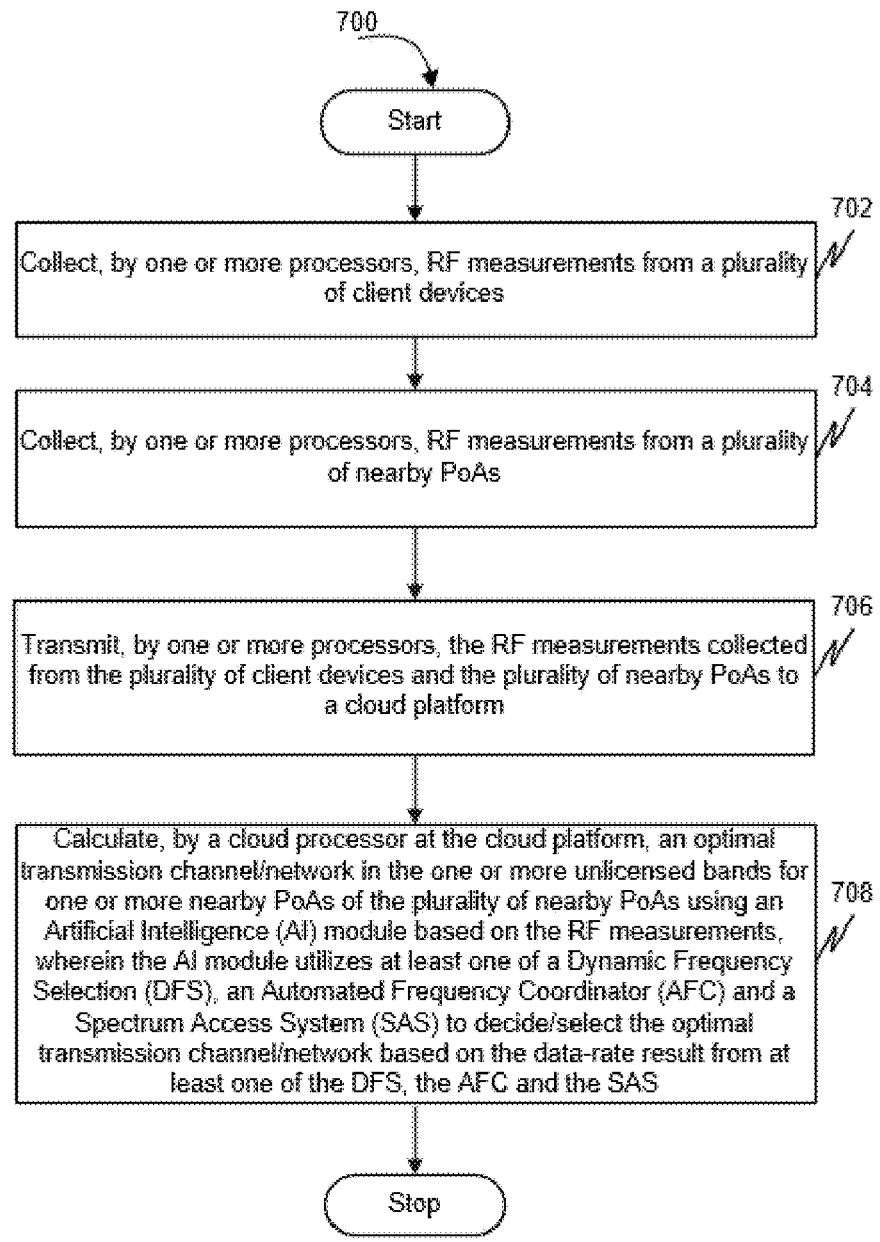
FIG. 7 is a flowchart that illustrates a method for optimizing utilization and performance of one or more unlicensed bands in a network through the spectrum orchestration application, in accordance with an exemplary embodiment of the disclosure.

FIG. 7 is a flowchart that illustrates a method for optimizing utilization and performance of one or more unlicensed bands in a network through the spectrum orchestration application in accordance with an exemplary embodiment of the disclosure. Referring to FIG. 7, there is shown a flowchart 700 for optimizing utilization and performance of one or more unlicensed bands in a network through the spectrum orchestration application 200.

At 702, collect, by one or more processors, RF measurements from a plurality of client devices. The RF measurement module 208 collects RF measurements from plurality of client devices 110A-110N.

At 704, collect, by one or more processors, RF measurements from a plurality of nearby PoAs. The RF measurement module 208 collects RF measurements from the plurality of nearby PoAs 112A-112N. A PoA may include, but is not limited to, a Wi-Fi AP and a 5G/LTE BS. The RF measurements may include, but are not limited to, RSSI measurements/values, capabilities and channels.

At 706, transmit by one or more processors, the RF measurements collected from the plurality of client devices and the plurality of nearby PoAs to a cloud platform. The RF measurements collected from the plurality of client devices 110A-110N and the plurality of nearby PoAs 112A-112N are transmitted to the cloud platform 108. Information pertaining to the one or more unlicensed bands and user preferences (minimum data rate, handover request, offloading setup) are also transmitted to the cloud platform 108. The information may include, but is not limited to, neighbor APs, channel number, RSSI, channel utilization rate, interference, shared spectrum, available spectrum, channel band, and SIM card.

At 708, calculate, by a cloud processor at the cloud platform, an optimal transmission channel/network in the one or more unlicensed bands for one or more nearby PoAs of the plurality of nearby PoAs using an AI module based on the RF measurements, wherein the AI module utilizes at least one of a DFS, an AFC module and an SAS module to select the optimal transmission channel/network based on the data-rate result from at least one of the DFS, the AFC module and the SAS. The cloud-based analyzer/optimizer 212 calculates an optimal transmission channel/network in the one or more unlicensed bands for one or more nearby PoAs of the plurality of nearby PoAs 112A-112N using AI module 214 based on the RF measurements collected at the cloud platform 108. The AI module 214 utilizes the DFS module 216, the AFC module 218 and the SAS module 220 to select the optimal transmission channel/network based on the data-rate result received from the DFS module 216, the AFC module 218 and the SAS module 220. An optimal transmission channel/network may include, but is not limited to, Wi-Fi channels and 5G/LTE Band 48.

In accordance with an embodiment, to calculate the optimal transmission channel/network in the one or more unlicensed bands, the AI module 214 solves a complex optimization problem based on the RF measurements collected from the plurality of client devices 110A-110N and the RF measurements collected from the plurality of nearby PoAs 112A-112N. All the information collected in the cloud platform 108 over different channels and network topologies are further tested utilizing the DFS module 216, the AFC module 218 and the SAS module 220 in the one or more unlicensed bands.

The training dataset of the AI module 214 is constructed from the measurements of the plurality of client devices 110A-110N and the solutions of traditional integer point optimization algorithm using the DFS module 216. The AFC module 218 communicates with an AFC framework frequently to revise data on a plurality of incumbent receivers kept in a database, to enable dynamically determining and obliging safety contours adequate to guard PtP links, and rejecting requests if emissions of an RLAN exceed an interference threshold in any individual incumbent link. The SAS module 220 determines which part of the CBRS spectrum can be used by the PAL tier users and GAA tier users and manages the use of available spectrum among users that request access. The PAL tier users and GAA tier users are allowed to access CBRS channels when the CBRS channels are not utilized by incumbent users/services.

In accordance with another embodiment, the dashboard generation module 226 provides a user-friendly dashboard with a plurality of KPIs to enable end-users to monitor the health of their networks. An end-user may include, but is not limited to, IT departments of operators, hotel brands and businesses.

In accordance with yet another embodiment, the bottleneck tracking and resolution module 228 is configured to perform collaborative monitoring of end-to-end connectivity of a network, by tracking bottlenecks in the path of the network and performing BGP/MPLS troubleshooting at a subscriber end. The BGP/MPLS troubleshooting comprises ensuring the prefix propagation is across the network, classifying the IP blocks and benchmarking the hops by grouping subscribers.

In accordance with yet another embodiment, the multi-threaded programming module 230 is implemented in case users have two or more PoAs to be connected, to minimize processing time in the analysis phase of an application. AsyncTask class is used to manage waiting processes of threads that work simultaneously and require results of an earlier thread(s) to terminate.

In accordance with yet another embodiment, the offload optimization module 232 is configured to enable users/operators to share PoAs (Wi-Fi and Private LTE/5G network) for Wi-Fi and CBRS connections, and to perform data offloading among cellular internet connection, Wi-Fi and CBRS connections. The AI module 214 is used to determine whether the offloading is desirable or not based on parameters such as, but not limited to, Wi-Fi interference, CBRS unit-cost rate, Number of active users, Licensed spectrum status, Costs, Guest characteristics, RSSI and Energy efficiency.

The present disclosure is advantageous in that it provides a cloud-based device-centric spectrum orchestration over unlicensed Wi-Fi and CBRS bands, where a cloud platform obtains and sets optimized parameters for end-users/operators with self-organizing network (SON) features, such as, but not limited to, channel/network selection, offloading, handover, network slicing, and parallel communication.

Further, the present disclosure considers a cloud-based management mechanism for Wi-Fi and CBRS PoAs to optimize overall performance and to provide improved performance and flexibility to the end-users, operators or businesses utilizing the unlicensed bands based on the interference reduction through AI algorithms.

For PoAs operating with low performance at high AP and STA density, the present disclosure combines SON features for smart and adaptive management of the transmission channels of PoAs, and software defined network (SDN) features for remote management and control of PoAs through a cloud-based mechanisms with the help of AI algorithms. This enables unlicensed wireless bands to operate at optimal performance with highly reduced computational load compared to traditional channel assignment optimization algorithms.

The method of the present disclosure comprises collecting, by one or more processors, Radio Frequency (RF) measurements from a plurality of client devices 110A-110N and from a plurality of nearby point of attachments (PoAs) 112A-112N. The method further comprises transmitting, by one or more processors, the RF measurements collected from the plurality of client devices 110A-110N and the plurality of nearby PoAs 112A-112N to a cloud platform 108. The method then comprises calculating, by a cloud processor at the cloud platform 108, an optimal transmission channel/network in the at least one unlicensed band for at least one nearby PoA of the plurality of nearby PoAs 112A-112N using an Artificial Intelligence (AI) module 214 based on the RF measurements, wherein the AI module 214 utilizes at least one of a Dynamic Frequency Selection (DFS), an Automated Frequency Coordinator (AFC) and a Spectrum Access System (SAS) to select the optimal transmission channel/network based on the data-rate result from at least one of the DFS, the AFC and the SAS.

The method further comprises transmitting information pertaining to at least one unlicensed band and user preferences, and wherein the information comprises at least one of neighbor APs, channel number, RSSI, channel utilization rate, interference, shared spectrum, available spectrum, channel band, and Subscriber Identification Module (SIM) card.

The method further comprises solving, by the AI module 214, a complex optimization problem based on the RF measurements collected from the plurality of client devices 110A-110N and the RF measurements collected from the plurality of nearby PoAs 112A-112N. The training dataset of the AI module 214 is constructed from the measurements of the plurality of client devices 110A-110N and the solutions of traditional integer point optimization algorithm using the DFS.

The method further comprises testing all the information collected in the cloud platform 108 over different channels and network topologies utilizing at least one of the DFS, the AFC and the SAS in the at least one unlicensed band. The training dataset of the AI module 214 is constructed from the measurements of the plurality of client devices 110A-110N and the solutions of traditional integer point optimization algorithm using the DFS.

The AFC communicates with an AFC framework frequently to revise data on a plurality of incumbent receivers kept in a database, to enable dynamically determining and obliging safety contours adequate to guard PtP links, and rejecting requests if emissions of a Radio Local Area Network (RLAN) exceed an interference threshold in any individual incumbent link.

The SAS determines which part of the CBRS spectrum can be used by the Priority Access Licensed (PAL) tier users and Generally Authorized Access (GAA) tier users, and manages the use of available spectrum among users that request access, wherein the PAL tier users and GAA tier users are allowed to access CBRS channels when the CBRS channels are not utilized by incumbent users/services.

The method further comprises providing a user-friendly dashboard with a plurality of Key Performance Indicators (KPIs) to enable end-users to monitor the health of their networks, wherein an end-user is at least one of IT departments of operators, hotel brands and businesses.

The method further comprises collaboratively monitoring end-to-end connectivity of a network, wherein the monitoring comprises tracking bottlenecks in the path and performing Border Gateway Protocol (BGP)/ Multiprotocol Label Switching (MPLS) troubleshooting at a subscriber end, wherein the BGP/MPLS troubleshooting comprises ensuring the prefix propagation is across the network, classifying the IP blocks and benchmarking the hops by grouping subscribers.

The method further comprises implementing multi-threaded programming in case users have two or more PoAs to be connected, to minimize processing time in the analysis phase of an application, wherein AsyncTask class is used to manage waiting processes of threads that work simultaneously and require results of an earlier thread(s) to terminate.

The method further comprises enabling users/operators share PoAs (Wi-Fi and Private LTE/5G network) for Wi-Fi and CBRS connections, and enabling data offloading among cellular internet connection, Wi-Fi and CBRS connections, wherein the AI module is used to determine whether the offloading is desirable or not based on parameters comprising at least one of Wi-Fi interference, CBRS unit-cost rate, Number of active users, Licensed spectrum status, Costs, Guest characteristics, RSSI and Energy efficiency.

A system 200 of the present disclosure comprises a memory 202 and a processor 204 communicatively coupled to the memory 202. The processor 204 is configured to collect Radio Frequency (RF) measurements from a plurality of client devices 110A-110N and from a plurality of nearby point of attachments (PoAs) 112A-112N. The processor 204 is further configured to transmit the RF measurements collected from the plurality of client devices 110A-110N and the plurality of nearby PoAs 112A-112N to a cloud platform 108. The processor 204 then calculates using a cloud processor at the cloud platform 108, an optimal transmission channel/network in the at least one unlicensed band for at least one nearby PoA of the plurality of nearby PoAs 112A-112N using an Artificial Intelligence (AI) module 214 based on the RF measurements, wherein the AI module 214 utilizes at least one of a Dynamic Frequency Selection (DFS), an Automated Frequency Coordinator (AFC) and a Spectrum Access System (SAS) to select the optimal transmission channel/network based on the data-rate result from at least one of the DFS, the AFC and the SAS.

The processor 204 is further configured to transmit information pertaining to at least one unlicensed band and user preferences, and wherein the information comprises at least one of neighbor APs, channel number, RSSI, channel utilization rate, interference, shared spectrum, available spectrum, channel band, and Subscriber Identification Module (SIM) card.

The AI module 214 is configured to solve a complex optimization problem based on the RF measurements collected from the plurality of client devices 110A-110N and the RF measurements collected from the plurality of nearby PoAs 112A-112N. The training dataset of the AI module 214 is constructed from the measurements of the plurality of client devices 110A-110N and the solutions of traditional integer point optimization algorithm using the DFS.

The processor 204 is further configured to test all the information collected in the cloud platform 108 over different channels and network topologies utilizing at least one of the DFS, the AFC and the SAS in the at least one unlicensed band. The training dataset of the AI module 214 is constructed from the measurements of the plurality of client devices 110A-110N and the solutions of traditional integer point optimization algorithm using the DFS.

The AFC communicates with an AFC framework frequently to revise data on a plurality of incumbent receivers kept in a database, to enable dynamically determining and obliging safety contours adequate to guard PtP links, and rejecting requests if emissions of a Radio Local Area Network (RLAN) exceed an interference threshold in any individual incumbent link.

The SAS determines which part of the CBRS spectrum can be used by the Priority Access Licensed (PAL) tier users and Generally Authorized Access (GAA) tier users, and manages the use of available spectrum among users that request access, wherein the PAL tier users and GAA tier users are allowed to access CBRS channels when the CBRS channels are not utilized by incumbent users/services.

The processor 204 is further configured to provide a user-friendly dashboard with a plurality of Key Performance Indicators (KPIs) to enable end-users to monitor the health of their networks, wherein an end-user is at least one of IT departments of operators, hotel brands and businesses.

The processor 204 is further configured to collaboratively monitor end-to-end connectivity of a network, wherein the monitoring comprises tracking bottlenecks in the path of the network and performing Border Gateway Protocol (BGP)/ Multiprotocol Label Switching (MPLS) troubleshooting at a subscriber end, wherein the BGP/MPLS troubleshooting comprises ensuring the prefix propagation is across the network, classifying the IP blocks and benchmarking the hops by grouping subscribers.

The processor 204 is further configured to implement multi-threaded programming in case users have two or more PoAs to be connected, to minimize processing time in the analysis phase of an application, wherein AsyncTask class is used to manage waiting processes of threads that work simultaneously and require results of an earlier thread(s) to terminate.

The processor 204 is further configured to enable users/operators share PoAs (Wi-Fi and Private LTE/5G network) for Wi-Fi and CBRS connections, and enable data offloading among cellular internet connection, Wi-Fi and CBRS connections, wherein the AI module is used to determine whether the offloading is desirable or not based on parameters comprising at least one of Wi-Fi interference, CBRS unit-cost rate, Number of active users, Licensed spectrum status, Costs, Guest characteristics, RSSI and Energy efficiency.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus/devices adapted to carry out the methods described herein may be suited. A combination of hardware and software may be a general-purpose computer system with a computer program that, when loaded and executed on the computer system, may control the computer system such that it carries out the methods described herein. The present disclosure may be realized in hardware that comprises a portion of an integrated circuit that also performs other functions. The present disclosure may also be realized as a firmware which form part of the media rendering device.

The present disclosure may also be embedded in a computer program product, which includes all the features that enable the implementation of the methods described herein, and which when loaded and/or executed on a computer system may be configured to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

The invention claimed is:

1. A method, comprising:
   collecting, by one or more processors, Radio Frequency (RF) measurements from a plurality of client devices;
   collecting, by the one or more processors, RF measurements from a plurality of nearby point of attachments (PoAs);
   transmitting, by the one or more processors, the RF measurements collected from the plurality of client devices and the plurality of nearby PoAs to a cloud platform; and
   calculating, by a cloud processor at the cloud platform, an optimal transmission channel and/or network in at least one unlicensed band for at least one nearby PoA of the plurality of nearby PoAs using an Artificial Intelligence (AI) module based on the RF measurements,
   wherein the calculating comprises solving, by the AI module, a complex optimization problem based on the RF measurements collected from the plurality of client devices and the RF measurements collected from the plurality of nearby PoAs,
   wherein the calculating further comprises testing all the information collected in the cloud platform over different channels and network topologies, and
   wherein the AI module utilizes at least one of a Dynamic Frequency Selection (DFS) or an Automated Frequency Coordinator (AFC) to select the optimal transmission channel and/or network based on a data-rate result from at least one of the DFS or the AFC.

2. The method of claim 1, wherein the optimal transmission channel and/or network is at least one of a Wi-Fi network or a Citizens Broadband Radio Service (CBRS) network.

3. The method of claim 1, wherein the RF measurements comprise Received Signal Strength Indicator (RSSI) measurements.

4. The method of claim 1, wherein the plurality of nearby PoAs comprises at least one of a Wi-Fi Access Point (AP) or a 5G/LTE Base Station (BS).

5. The method of claim 1, wherein the transmitting further comprises transmitting information pertaining to the at least one unlicensed band and user preferences, and wherein the information comprises identifiers of at least one of neighbor APs, channel number, RSSI, channel utilization rate, interference, shared spectrum, available spectrum, channel band, and identifiers of Subscriber Identification Module (SIM) cards.

6. The method of claim 1, wherein the optimal transmission channel and/or network comprises at least one of Wi-Fi channels and 5G/LTE Band 48.

7. The method of claim 1, wherein training dataset of the AI module is constructed from the RF measurements of the plurality of client devices and solutions of traditional integer point optimization algorithm, wherein the solutions of traditional integer point algorithm are optimized using the DFS.

8. The method of claim 1, wherein the AFC communicates with an AFC framework to revise data on a plurality of incumbent receivers kept in a database, to enable dynamically determining and obliging safety contours adequate to guard Point to Point links, and rejecting requests if emissions of a Radio Local Area Network (RLAN) exceed an interference threshold in any individual incumbent link.

9. The method of claim 1, wherein the AI module further utilizes a Spectrum Access System (SAS) to select the optimal transmission channel and/or network based on a data-rate result from the SAS, and wherein the SAS determines which part of a CBRS spectrum can be used by Priority Access Licensed (PAL) tier users and Generally Authorized Access (GAA) tier users, and manages a use of available spectrum among users that request access, wherein the PAL tier users and GAA tier users are allowed to access CBRS channels when the CBRS channels are not utilized by incumbent users/services.

10. The method of claim 1 further comprises providing a user-friendly dashboard with a plurality of Key Performance Indicators (KPIs) to enable end-users to monitor health of the optimal transmission channel and/or network, wherein an end-user is at least one of IT departments of operators, hotel brands and businesses.

11. The method of claim 1 further comprises monitoring end-to-end connectivity of a network, wherein the monitoring comprises tracking bottlenecks in a path of the network and performing Border Gateway Protocol (BGP)/Multiprotocol Label Switching (MPLS) troubleshooting at a subscriber end, wherein the BGP and/or the MPLS troubleshooting comprises ensuring a prefix propagation is across the network, classifying IP blocks and benchmarking hops by grouping subscribers.

12. The method of claim 1 further comprises implementing multi-threaded programming in case users have the plurality of nearby PoAs to be connected, to minimize processing time in an analysis phase of an application, wherein AsyncTask class is used to manage waiting processes of threads that work simultaneously and require results of an earlier thread(s) to terminate.

13. The method of claim 1 further comprises enabling users and/or operators to share the plurality of nearby PoAs for Wi-Fi and CBRS connections, and enabling data offloading among cellular internet connection, Wi-Fi and CBRS connections, wherein the AI module is used to determine whether the offloading is desirable or not based on parameters comprising at least one of Wi-Fi interference, CBRS unit-cost rate, Number of active users, Licensed spectrum status, Costs, Guest characteristics, RSSI and Energy efficiency.

14. A system, comprising:
   a memory;
   a processor communicatively coupled to the memory, wherein the processor is configured to:

collect Radio Frequency (RF) measurements from a plurality of client devices;

collect RF measurements from a plurality of nearby point of attachments (PoAs);

transmit the RF measurements collected from the plurality of client devices and the plurality of nearby PoAs to a cloud platform; and calculate, by a cloud processor at the cloud platform, an optimal transmission channel and/or network in at least one unlicensed band for at least one nearby PoA of the plurality of nearby PoAs using an Artificial Intelligence (AI) module based on the RF measurements, wherein the calculation comprises solving, by the AI module, a complex optimization problem based on the RF measurements collected from the plurality of client devices and the RF measurements collected from the plurality of nearby PoAs, wherein the calculating further comprises testing all the information collected in the cloud platform over different channels and network topologies, and wherein the AI module utilizes at least one of a Dynamic Frequency Selection (DFS) or an Automated Frequency Coordinator (AFC) to select the optimal transmission channel and/or network based on a data-rate result from at least one of the DFS or the AFC.

15. The system of claim 14, wherein the optimal transmission channel and/or network is at least one of a Wi-Fi network or a Citizens Broadband Radio Service (CBRS) network.

16. The system of claim 14, wherein the processor is further configured to transmit information pertaining to the at least one unlicensed band and user preferences, wherein the information comprises identifiers of at least one of neighbor APs, channel number, RSSI, channel utilization rate, interference, shared spectrum, available spectrum, channel band, and identifiers of Subscriber Identification Module (SIM) cards.

17. The system of claim 14, wherein the optimal transmission channel and/or network comprises at least one of Wi-Fi channels and 5G/LTE Band 48.

18. The system of claim 14, wherein training dataset of the AI module is constructed from the RF measurements of the plurality of client devices and solutions of traditional integer point optimization algorithm, wherein the solutions of traditional integer point algorithm are optimized using the DFS.

19. The system of claim 14, wherein the AFC communicates with an AFC framework to revise data on a plurality of incumbent receivers kept in a database, to enable dynamically determining and obliging safety contours adequate to guard Point to Point links, and rejecting requests if emissions of a Radio Local Area Network (RLAN) exceed an interference threshold in any individual incumbent link.

20. The system of claim 14, wherein the AI module further utilizes a Spectrum Access System (SAS) to select the optimal transmission channel and/or network based on a data-rate result from the SAS, and wherein the SAS determines which part of a CBRS spectrum can be used by Priority Access Licensed (PAL) tier users and Generally Authorized Access (GAA) tier users, and manages a use of available spectrum among users that request access, wherein the PAL tier users and GAA tier users are allowed to access CBRS channels when the CBRS channels are not utilized by incumbent users/services.

21. The system of claim 14, wherein the processor is further configured to provide a user-friendly dashboard with a plurality of Key Performance Indicators (KPIs) to enable end-users to monitor health of the optimal transmission channel and/or network, wherein an end-user is at least one of IT departments of operators, hotel brands and businesses.

22. The system of claim 14, wherein the processor is configured to monitor end-to-end connectivity of a network, wherein the processor is further configured to track bottlenecks in a path of the network and perform Border Gateway Protocol (BGP)/Multiprotocol Label Switching (MPLS) troubleshooting at a subscriber end, wherein the BGP and/or the MPLS troubleshooting comprises ensuring a prefix propagation is across the network, classifying IP blocks and benchmarking hops by grouping subscribers.

23. The system of claim 14, wherein the processor is further configured to implement multi-threaded programming in case users have the plurality of nearby PoAs to be connected, to minimize processing time in an analysis phase of an application, wherein AsyncTask class is used to manage waiting processes of threads that work simultaneously and require results of an earlier thread(s) to terminate.

24. The system of claim 14, wherein the processor is further configured to enable users and/or operators to share the plurality of nearby PoAs for Wi-Fi and CBRS connections, and enable data offloading among cellular internet connection, Wi-Fi and CBRS connections, wherein the AI module is used to determine whether the offloading is desirable or not based on parameters comprising at least one of Wi-Fi interference, CBRS unit-cost rate, Number of active users, Licensed spectrum status, Costs, Guest characteristics, RSSI and Energy efficiency.

* * * * *